United States Patent Office 2,931,832
Patented Apr. 5, 1960

2,931,832
PREPARATION OF 2-ETHYL-CIS-CROTONYLUREA

Otis E. Fancher, Elkhart, Ind., assignor to Miles Laboratories, Inc., Elkhart, Ind., a corporation of Indiana No Drawing. Application November 21, 1958
Serial No. 775,383

15 Claims. (Cl. 260—553)

This invention relates to a process for the preparation of new and useful chemical compositions. Particularly the invention relates to processes for the preparation of the higher melting isomer of 2-ethylcrotonylurea. Still more particularly, the invention relates to a process for the dehydrohalogenation of carbromal by heating at elevated temperatures with an oxide of metal.

This application is a continuation-in-part of Serial No. 686,827, filed September 30, 1957, as well as of Serial No. 699,474, filed November 29, 1957, a continuation-in-part of the above application Serial No. 686,827, which in turn is a continuation-in-part of Serial No. 580,664, filed April 9, 1956, which is a division of Serial No. 316,812, filed October 24, 1952, all applications being for the same inventor. The above identified prior applications have been abandoned.

As is well known, sedatives of the barbiturate class in common use today have certain detrimental properties making them inherently dangerous. In the first place, these compounds generally have a small range between effective and dangerous doses. In addition, their use is very commonly followed by "hangover" in the sense that the individual taking them feels dull or depressed after the sedative effect of these drugs has passed. Finally, it is now believed that sedatives of the barbiturate group are capable of producing some degree of addiction.

Accordingly, with these defects in mind we have now discovered a superior sedative or hypnotic possessing none of the disadvantages of sedatives in use today. We have discovered that compositions of 2-ethyl-cis-crotonylurea in standard pharmaceutical excipients or dispersants are particularly suitable as hypnotics for human use.

The higher melting isomer of the compound 2-ethylcrotonylurea having the "cis" configuration has the following formula:

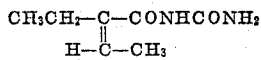

This compound is most conveniently prepared by the dehydrohalogenation of 2-ethyl-2-bromo-butylurea, or, as it is generally known, carbromal, and proceeds according to the following equation:

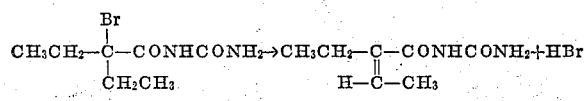

As will be pointed out more in detail below, this dehydrogenation may be accomplished by contacting carbromal with an oxide of a metal at elevated temperatures. The metallic oxide may be used in the presence of an organic solvent. It is also contemplated that the carbromal and the metallic oxide in a highly dispersed dry form, such as a powder or the like, may be intimately contacted throughout the heating period. In this process the fusion of the reactants is preferably carried out at pressures below atmospheric pressures.

Although metallic oxides in general may be used to dehydrohalogenate carbromal to the higher melting isomer of 2-ethylcrotonylurea, it is preferred to use an oxide of beryllium, cadmium, calcium, copper, lead, mercury, silver, zinc or zirconium. Of these metallic oxides, especially preferred are the oxides of silver, cadmium and zinc.

As was stated above, the dehydrohalogenation reaction may be carried out in the presence of an organic solvent. Examples of operable solvents include ethanol, isopropanol and butanol. In this process the carbromal is dissolved in the solvent and the metallic oxide in the form of a fine dispersion is added to the mixture and the temperature elevated to the boiling point of the solvent. Reflux is continued for the desired period of time depending upon the particular metallic oxide used. The reaction mixture is then filtered and the metallic halide extracted. The reaction mixture is then filtered, concentrated to the desired point and cooled. The product crystallizes from the cooled solution and may be purified by recrystalilzation according to methods with which the art is familiar.

It has also been discovered that the desired metallic oxide in a finely dispersed dry state may be intimately admixed and fused with carbromal without a solvent. The dehydrohalogenation reaction is preferably carried out in a vacuum in this embodiment of the invention. It is necessary that the components of the reaction mixture be maintained in intimate contact throughout the heating period by suitable mixing means. The product resulting from the reaction is then dissolved in a suitable solvent and the product work-up carried out by means known to the art.

To illustrate more explicitly the concept of the instant invention, the following examples are set out in detail:

EXAMPLE I

Fifty-four grams of carbromal in 600 cc. of isopropanol was stirred and refluxed for three hours with 27.8 grams of anhydrous silver oxide. The reaction mixture was filtered and the silver residue was extracted with 100 cc. of boiling isopropanol. The filtered and dried solids which separated weighed 22.5 grams and melted at 189–190.5°. Concentration of the filtrate yielded an additional 3.3 grams of product which melted at 160–170°. These two crops were separately obtained as white needles by crystallization from alcohol and exhibited slight solubility in water. The first crop gave 21.7 grams of high melting 2-ethylcrotonylurea with a melting point of 191–193° C. and the second crop gave 0.9 gram with a melting point of 191–193° C. for a total yield of 22.6 grams or 63% of the theoretical yield.

EXAMPLE II 47.4 grams of carbromal and 16.8 grams of finely ground calcium oxide in 100 ml. of dioxan were heated at reflux with stirring for 30 minutes. The hot mixture was filtered and the filtrate was mixed with 300 grams of ice and water. The solid material was collected, washed with water and dried. The crude product was heated to boiling with 100 ml. of benzene. Much of the material remained undissolved. After cooling, the solid material was collected, washed with benzene and dried. The colorless material thus obtained weighed 9.6 grams (31%) and melted at 192–194°.

EXAMPLE III 23.7 grams of carbromal was dissolved in 200 cc. of isopropanol. The solution was placed in a flask equipped with a stirrer and a reflux condenser. Lead hydroxide was heated to 150° C. to obtain lead oxide. 22.3 grams of lead oxide so prepared was added to the solution. The mixture was heated to reflux with stirring for 1.5 hours.

The mixture was then filtered and concentrated to approximately 60 cc. and allowed to stand overnight. The crystals which separated from this concentrated solution were filtered and washed and recrystallized three times from ethanol. There was obtained colorless, thick needles which melted at approximately 165° C., obviously a mixture of the two isomers.

EXAMPLE IV

Ninety grams of carbromal, 120 grams of a technical grade of red cuprous oxide and 600 cc. of n-butanol were placed in a 1 liter flask equipped with a stirrer and a reflux condenser. The mixture was heated to reflux with stirring and held at that temperature for 8 hours.

The material was filtered while hot and the filter washed with 40 cc. of hot isopropanol. The filtrate was cooled to 2° C. and the crystallized product was filtered, washed and dried.

This product was recrystallized by dissolving in 300 cc. of hot isopropanol. The solution was filtered, cooled to 2° C., the crystals washed and dried. There was obtained 18.5 grams (31.4% yield) of a product melting at 195 to 196° C.

EXAMPLE V 4 lbs. of carbromal, 5.3 lbs. of a technical grade of red cuprous oxide and 25.3 lbs. of isopropanol were placed in a 5 gallon glass lined Pflauder reactor and heated to reflux.

After 18 hours of refluxing the batch was filtered through a Sparkler filter. The filter and reactor were rinsed with 22 lbs. of isopropanol. The filtrate was returned to the reactor and 22 lbs. of isopropanol was removed by distillation. The batch was then cooled to 0° C., centrifuged and the crystals washed with 6 lbs. of isopropanol.

The product obtained thereby was dried in an oven at 50° C. to constant weight. There was obtained 1.32 lbs. of the product (579½ grams).

60 grams of this product was placed in a 1 liter flask with 450 cc. of isopropanol. The mixture was then heated to 83° C. and an additional 50 cc. of isopropanol added. The solution was then filtered while hot and the filtrate cooled to 3° C.

The crystallized product was filtered, washed with 30 to 40 cc. of isopropanol at 25° C. and dried. There was obtained a yield of 49.5 grams of a white product melting at 195.5–197° C. This represents a yield of 40.5% theory.

This product was hydrogenated over platinum oxide at 55 lbs. pressure per square inch of hydrogen and at a temperature of 50° C. The hydrogen uptake, 80% of theory, resulted in a product which was proven by infrared absorption data to be diethylacetylurea, the product which would result from hydrogenation of 2-ethyl-cis-crotonylurea.

EXAMPLE VI 23.7 grams (0.1 mole) of carbromal and 6.5 grams (0.051 mole) of cadmium oxide in 250 ml. of isopropanol were stirred at reflux. The brown color of the cadmium oxide gradually lightened, and after three hours, the color was a pale brown. Stirring and heating were continued for an additional three hours to give a pure white suspension (cadmium dibromide). The reaction mixture was filtered, and a white solid started to separate immediately. The solid mass was filtered, washed with water, and dried at 105°. This weighed 12.2 grams, which is a yield of 78%, and melted at 181–183°. It was recrystallized from 200 ml. of isopropanol to give 9.15 grams (58.6% yield) of a product which melted at 191–193°. Concentration of the filtrates and recrystallization of the second crops gave material melting at 150–155°.

EXAMPLE VII 23.7 grams (0.1 mole) of carbromal and 6.5 grams (0.102 mole) of cadmium oxide were caused to react in isopropanol as described in Example VI. Reaction was complete in four hours. The cadmium oxide was not completely pulverized at the start of the reaction, and a few lumps of unreacted oxide remained. This reaction was worked up as in Example VI except the original filtrate was evaporated to dryness and treated with water to remove soluble material. The original precipitate weighed 12 grams after drying, and the water-washed second crop weighed 3 grams after drying. Recrystallization of the first crop gave 9.48 grams of 2-ethyl-cis-crotonylurea (M.P.: 191–193°), a yield of 60.7%, and a negligible second crop. Recrystallization of the second crop from the original filtrate gave 2 grams of 2-ethyl-transcrotonylurea (M.P.: 155–157°).

EXAMPLE VIII 23.7 grams (0.1 mole) of carbromal and 6.5 grams (0.102 mole) of cadmium oxide in 200 ml. of n-butanol were stirred and heated to reflux. After ¾ hour the brown color of the cadmium oxide was discharged to give a clear solution. Stirring and heating were continued for another hour during which time a white precipitate separated. The reaction mixture was chilled in an ice bath, and the separated solid was collected by filtration and washed on the filter with cold water to remove soluble salts. The material was dissolved in 300 ml. of hot isopropanol, filtered and chilled in an ice bath. The white solid which separated was filtered and dried. The product obtained weighed 7.2 grams (46.2% yield) and melted at 191–193°.

EXAMPLE IX 47.4 grams (0.2 mole) of carbromal and 12.8 grams (0.1 mole) of cadmium oxide were ground together intimately in a mortar. The mixture was placed in a 200 ml. round bottom flask fitted with an air-cooled condenser, and the flask was heated in a wax bath. When the bath temperature reached 125°, the mixture began to fuse. When the pot temperature reached 125°, the bath was removed, and the temperature inside the pot rose spontaneously to 150°. Water was given off, and a rather vigorous exothermic reaction set in. After ten minutes the temperature had fallen to 130°, and an almost white solid material remained. The mixture was heated at 125–130° (pot temperature) for 30 minutes longer. The reaction mixture was extracted with 500 ml. of boiling isopropanol. It was necessary to break up the hard lumps. The insoluble material was removed by filtration, and the filtrate was cooled in an ice bath. The white crystals were collected, washed with cold isopropanol and dried. The product thus obtained (16.2 grams, 52% yield) melted at 188–190°. The material was recrystallized from isopropanol to give 13.8 grams (44% yield) of a product which melted at 190–192°.

Although the above examples set out in detail illustrations of the concept of this invention, it is, of course, obvious that minor variations may be included within the scope of the invention. For example, when the reactants are contacted in the presence of a solvent, it is contemplated that for each mole of carbromal used there will be present from 1 to 2 equivalents of the metallic oxide in sufficient solvent to insure complete solution and reaction. In the solution process the temperature used will be the boiling temperature of the solvent and will usually range between 50° and 150° C. The time of contact in solution should preferably be between 1 and 24 hours. In the dry contact or fusion process the proportions of carbromal and the metallic oxide will be the same as in the solution method. However, the temperature of reaction should be between about 100° and 150° C. and the time of reaction for from ¼ to 2 hours.

The fusion reaction is ordinarily carried out at atmospheric pressure or below, preferably from atmospheric pressure to 1 mm./Hg.

It should be specifically pointed out that unless the conditions of the dehydrohalogenation reaction are specifically controlled, there will be obtained undesired quantities of the lower melting isomer of 2-ethyl-crotonylurea or 2-ethyl-trans-crotonylurea. This lower melting isomer has the following configuration:

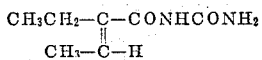

This lower melting isomer has little of the desirable sedative properties of the higher melting isomer and has a toxicity which makes it undesirable for use. Prior art methods of preparing 2-ethylcrotonylurea have described the use of pyridine, sodium hydroxide, and the like as a dehydrohalogenating agent, and this reaction proceeds in accordance with the following equation:

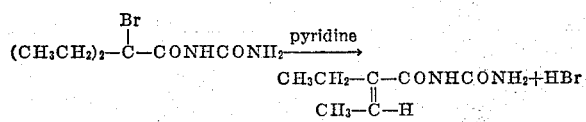

A comparison of the pharmacological data obtained upon both the higher and lower melting isomer is set out below.

*High melting isomer (2-ethyl-cis-crotonylurea)*

2-ethyl-cis-crotonylurea has been demonstrated to be a sedative agent which is effective orally in rodents, dog and man, and at a small fraction of the acute or single lethal dose, 1–3% of the A–LD50. With higher doses, subhypnotic effects are encountered around 40–60% of the A–LD50, and complete hypnosis at about the acute lethal dose itself, i.e. 93–96% A–LD50. It thus has a large range of sedative dosage which is free from undesired effects, and a wide margin of safety from death.

Compared with other sedatives or tranquilizers on the basis of the acute hypnotic dose (A–HD50), 2-ethyl-cis-crotonylurea with an A–HD50 close to the A–LD50 was found to occupy an intermediate position, having a lower hypnotic dose than the psychosedatives, such as reserpine and chlorpromazine, but a higher one than the hypnosedatives, such as the somnifacient barbiturates. The employment of hypnotic ranking as a means of classifying sedative activity and determining the type to which the isomers of 2-ethyl-cis-crotonylurea belong appears to have been justified since 2-ethyl-cis-crotonylurea has been shown to have little or no effect in the manifest psychoses or in inducing sleep, but to exert a definite calmative effect in states of tension and anxiety in children and in adults. The effectiveness of 2-ethyl-cis-crotonylurea in neurotic rather than psychotic conditions explains the designation of the type of activity exhibited by it as neurosedative.

2-ethyl-cis-crotonylurea has no effect on the respiration or circulation, or on gastric secretion or motility in unanesthetized dogs, and exhibits no anti-electroconvulsive or anti-chemoconvulsive activity in rats at any oral dosage within the sedative range (i.e. up to 50% of the acute lethal dose).

In spite of the relative insolubility of 2-ethyl-cis-crotonylurea, it is readily absorbed. In 125 grams, rat, enough of a 30 mg. (circa 10% A–LD50) oral dose is absorbed within 20 minutes to induce sedation, and about ⅔ of a 112 mg. oral dose is absorbed from the small intestine in five hours; none is taken up from the stomach. Employing $C^{14}$ labelled 2-ethyl-cis-crotonylurea, it has been shown that sedative doses administered to rats and dogs are promptly absorbed and that urinary excretion of radioactivity, mostly as urea with some inorganic carbonates and 2-ethyl-cis-crotonylurea itself, is largely complete in eight hours. A small part is metabolized and expelled in the expired air.

The range in the oral A–LD50 of 2-ethyl-cis-crotonylurea in rats extends from 1600 to 3400 m./kg. with an average of 2500. This variability has been shown to be due not to contaminants but to variation in crystal size and the influence of this factor on the rate of absorption of the relatively insoluble material.

No tolerance develops to 2-ethyl-cis-crotonylurea on chronic or daily oral dosage, even when the dose is raised to the lethal limit, nor is there any significant degree of cumulation; the chronic lethal dose or C–LD50 is around 85% of the A–LD50. The stable response to daily dosage with 2-ethyl-cis-crotonylurea stands in marked contrast to the fading response to daily dosage of such sedatives as chlorpromazine and pentobarbital both of which induce marked tolerance. Chronic administration to rats (at 10 and 20% A–LD50/day) and dogs (at 2 and 20% A–LD50/day) for a period of six months causes no apparent alteration in growth, or any pathological change in the blood elements or in the stomach, small and large intestines, liver or spleen.

*Low melting isomer (2-ethyl-trans-crotonylurea)*

Given orally, 2-ethyl-trans-crotonylurea is more than twice as toxic as 2-ethyl-cis-crotonylurea in the rat or the dog. It is somewhat more soluble in water than 2-ethyl-cis-crotonylurea. It causes sedation and ataxia at about 7% in the rat and 17% in the dog, subhypnosis at 87–91%, and hypnosis at 110–118% of the A–LD50: (See Table 1). These dose levels are somewhat higher than the corresponding ones for 2-ethyl-cis-crotonylurea. In the rat, the principal difference between 2-ethyl-cis-crotonylurea and 2-ethyl-trans-crotonylurea is that with 2-ethyl-cis-crotonylurea the progression from sedation through subhypnosis to hypnosis is quiet and uneventful, whereas 2-ethyl-trans-crotonylurea produces tremors or repetitive jerks involving chiefly the head, neck and extremities during subhypnosis and early hypnosis. The latter are sometimes rapid and rhythmic enough to merit description as minimal convulsive seizures; occasionally full fledged convulsions occur. Another difference is the development of analgesia (loss of vocalization and motor response to tail pinch) during late sedation with 2-ethyl-trans-crotonylurea prior to passing into subhypnosis and hypnosis, whereas with 2-ethyl-cis-crotonylurea the motor response usually persists well into hypnosis. Whether the train of symptoms from analgesia to convulsive jerks results from the blockade of the afferent system concerned with the perception and response to pain, or from effects on more than one system of pathways, it is clear that 2-ethyl-trans-crotonylurea blocks other afferent systems besides the alerting or activating system in the centrecephalic brain stem or blocks these at a lower dose level than 2-ethyl-cis-crotonylurea, if both act on the same systems.

In the dog, 2-ethyl-trans-crotonylurea causes vomiting, intermittent tremors or repetitive jerks and little or no sedation when given orally. The tremors and jerks occur chiefly in the head and neck at a rate of 24–32 per minute (in one series of counts), and last several minutes with long and irregular intervals in between. In some cases the jerks also affect the trunk and the extremities.

Vomiting and head jerks still occur when the drug is injected directly into the duodenum. Vomiting occurs within 4–22 minutes regardless of the dose which may be varied from 18 to 364% of the A–LD50 (200 to 4,000 mg./kg.), and head jerks appear after an interval which becomes shorter (56 to 4 minutes) as the dose is increased. Up to 55% A–LD50, the dogs are sedated when not aroused by vomiting or jerks. At higher doses, the hyperkinetic manifestations nullify the sedative effect causing restlessness and whining. The jerks continue throughout the great part of the hypnotic stage, being superimposed upon the hypnotic prostration. Although the hyperkinetic responses in the dog differ in detail from those observed in the rat, it is probably that they are the consequences of effects on analogous pathways.

2-ethyl-trans-crotonylurea thus has both a sedative and a "stimulatory" effect, although the latter may result from inhibitory release rather than excitation. The pathways blocked may be different from those affected by 2-ethyl-cis-crotonylurea, or the difference may be only a temporal one.

Like 2-ethyl-cis-crotonylurea, no tolerance to the lethal effect of 2-ethyl-trans-crotonylurea develops on chronic or daily dosage in rats (the C–LD50 is about 83% of the A–LD50). No pathology of the blood or tissue is found in rats given 18 and 40% A–LD50 per day for six months. There is, however, some evidence of hyperactivity.

These data are set out in detail in Table 1 below.

TABLE 1.—COMPARISON OF ACUTE PHARMACOLOGICAL PROFILES OF 2-ETHYL-CIS-CROTONYLUREA AND 2-ETHYL-TRANS CROTONYLUREA

| Route of Admin. | Sedation A-SD50 % | Acute (single dose) | | | | | | Chronic (daily dose) | | | |
|---|---|---|---|---|---|---|---|---|---|---|---|
| | | Analgesia [1] | | Subhyp-nosis A-SHD50 % | Hyp-nosis A-HD50 % | Tremors and Jerks A-TJD50 % | Death A-LD50 | | Subhyp-nosis C-SHD50 % | Hyp-nosis C-HD50 % | Death C-LD50 | |
| | | Vocal block | Motor block | | | | mg./kg. | % | | | mg./kg. | % |
| Cis Isomer: | | | | | | | | | | | | |
| Rat OR | 3 | | | 60 | 96 | none | 2,500 | 100 | 78 | 94 | 2,125 | 85 |
| Rat IP | | 62 | 103 | 67 | 103 | none | 2,285 | 100 | | | | |
| Dog ID | 1 | | | 35 | 57 | none | 1,575 | 100 | | | | |
| Trans Isomer: | | | | 39 | 93 | none | 2,800 | 100 | | | | |
| Rat OR | 7 | | | 87 | 110 | | 1,130 | 100 | 65 | 83 | 937 | 83 |
| Rat IP | | [2]78 | [2]78 | 103 | 118 | [2]128 | 1,015 | 100 | | | | |
| Dog ID | 17 ? | Vomiting [2]13 | | 57 | 62 | 46 | 575 | 100 | | | | |
| | | | | 73 | 100 | [2]27 | 1,100 | 100 | | | | |

%—Dose given in percent of A–LD50 determined by Weil's [10] method.
OR—oral; IP—intraperitoneal; ID—intraduodenal.
[1] Tested by vocal and motor response to tail pinch.
[2] Note that only Trans Isomer induces analgesia, vomiting and tremors and jerks.

To summarize briefly, this invention relates to a process for the preparation of 2-ethyl-cis-crotonylurea by the dehydrohalogenation of carbromal with a metallic oxide. The reactants may be contacted in the presence of a solvent such as a low molecular weight organic solvent or they may contacted in the dry state and fused together at reduced pressure.

What is claimed is:

1. A process for the preparation of 2-ethyl-cis-crotonylurea which comprises dehydrohalogenating carbromal in the presence of an oxide of a metal selected from the class consisting of beryllium, cadmium, calcium, copper, lead, mercury, silver, zinc and zirconium and extracting 2-ethyl-cis-crotonylurea from the reaction mixture.

2. A process for the dehydrohalogenation of carbromal to 2-ethyl-cis-crotonylurea which comprises the steps of fusing 1 mole of carbromal with from 1 to 2 equivalents of an oxide of a metal selected from the class consisting of beryllium, cadmium, calcium, copper, lead, mercury, silver, zinc and zirconium at a temperature within the range of from 100° to 150° C. for a period of time of from ¼ to 2 hours and recovering the desired product therefrom.

3. A process according to claim 2 wherein said metallic oxide is silver oxide.

4. A process according to claim 2 wherein said metallic oxide is cadmium oxide.

5. A process according to claim 2 wherein said metallic oxide is cuprous oxide.

6. A process according to claim 2 wherein said metallic oxide is zinc oxide.

7. A process for the preparation of 2-ethyl-cis-crotonylurea which comprises the steps of intimately contacting 1 mole of carbromal with from 1 to 2 equivalents of a metallic oxide selected from the class consisting of beryllium, cadmium, calcium, copper, lead, mercury, silver, zinc and zirconium in the presence of an organic solvent at a temperature of from 50° to 150° C. for from 1 to 24 hours and recovering the desired product therefrom.

8. A process according to claim 7 wherein said metallic oxide is silver oxide.

9. A process according to claim 7 wherein said metallic oxide is cadmium oxide.

10. A process according to claim 7 wherein said metallic oxide is cuprous oxide.

11. A process according to claim 7 wherein said metallic oxide is zinc oxide.

12. A process for the preparation of 2-ethyl-cis-crotonylurea which comprises dehydrohalogenating carbromal in the presence of silver oxide and extracting 2-ethyl-cis-crotonylurea from the reaction mixture.

13. A process for the preparation of 2-ethyl-cis-crotonylurea which comprises intimately admixing 54 grams of carbromal, 27.8 grams of anhydrous silver oxide in 600 cc. of isopropanol, heating to reflux for 3 hours and recovering therefrom the desired final product.

14. A process for the preparation of the higher melting isomer of 2-ethylcrotonylurea which comprises dehydrohalogenating carbromal in the presence of cadmium oxide and extracting 2-ethyl-cis-crotonylurea from the reaction mixture.

15. A process for the preparation of 2-ethyl-cis-crotonylurea which comprises intimately admixing 24 grams of carbromal, 6.5 grams of cadmium oxide in 250 cc. of isopropanol, heating to reflux for 4 to 6 hours, and recovering therefrom the desired final product.

No references cited.